United States Patent Office 2,794,840
Patented June 4, 1957

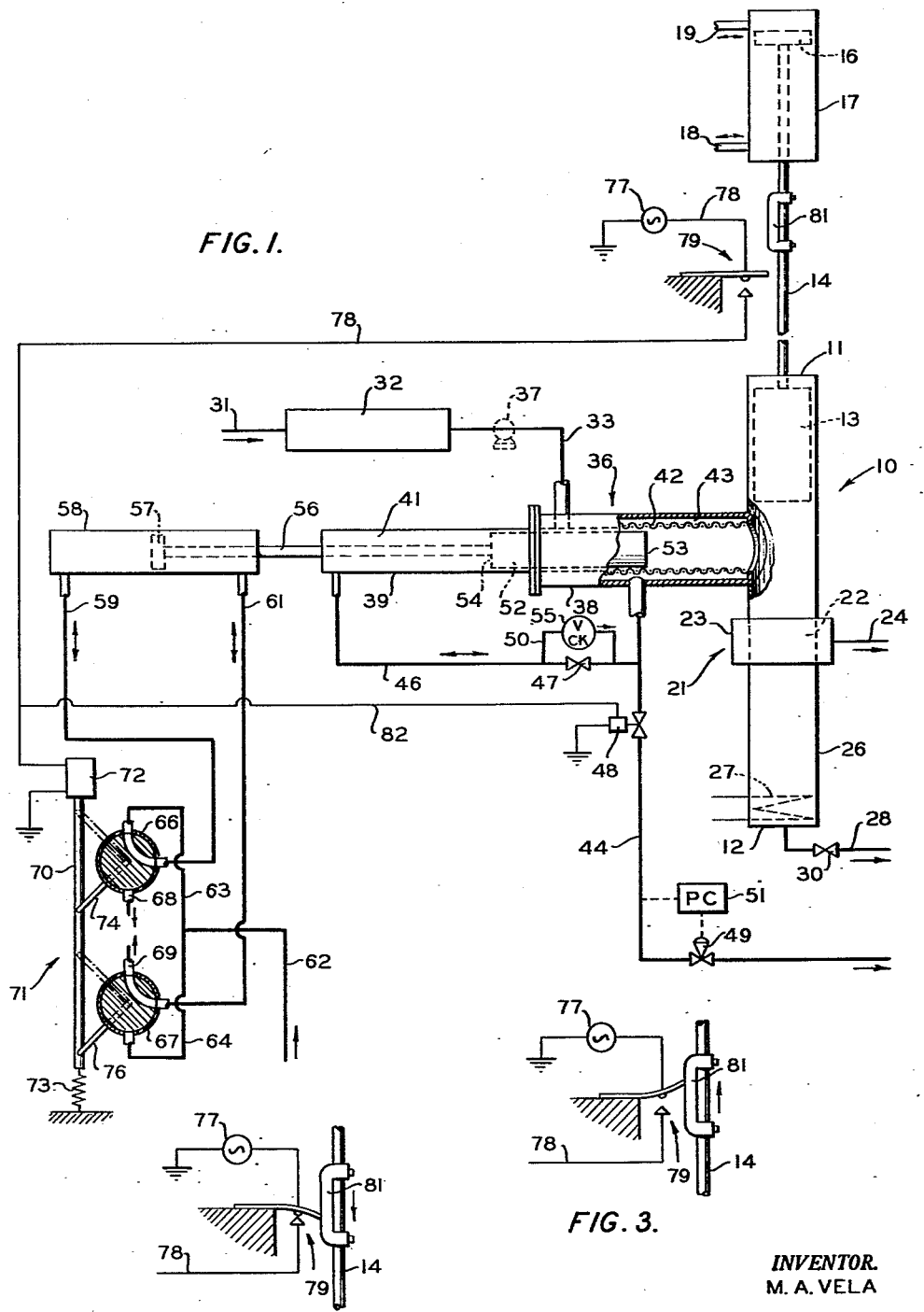

2,794,840

FRACTIONAL CRYSTALLIZATION PROCESS AND APPARATUS

Macedonio Angel Vela, Bartlesville, Okla., assignor to Phillips Petroleum Company, a corporation of Delaware Application February 7, 1955, Serial No. 486,663

13 Claims. (Cl. 260—666)

This invention relates to the separation and purification of components of liquid multi-component mixtures. In one of its more specific aspects, it relates to the separation and purification of liquid multi-component mixture by fractional crystallization. In another of its more specific aspects, it relates to fractional crystallization apparatus which includes an improved in-line type prefilter. In still another of its more specific aspects, it relates to a method of cleaning the filter medium of an in-line type filter used in fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering in many cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least the higher melting component and thereafter separating crystals from the mother liquor. The crystals are then introduced into a purification section or column in one end of which a melting section is maintained. The crystals are moved through the purification section toward the melting section where the crystals are melted, and a portion of the melt is withdrawn as product. The remainder of the melt is displaced as a reflux stream countercurrently to the movement of the crystals and in intimate contact therewith so as to remove occluded impurities.

When practicing the above-decreased crystal separation and purification method, it is sometimes desirable to supply the separation and purification column with a thick rather than a thin slurry of crystals and mother liquor. Accordingly, a pre-filtering means is often used in combination with the separation and purification column in order that mother liquor may be separated from the crystals prior to introduction into the column for further separation and purification. While it has been found that in-line filters as used in crystal separation and purification columns operate very efficiently and show good filter rates, their use as pre-filters has not been entirely satisfactory because clogging of the filter screen with crystals results in greatly reduced filter rates. Furthermore, with in-line filters which utilize a piston for advancing crystals through the filter, there is often a tendency for part of the filter cake to cling to the piston on the backstroke of the piston. This results in interference with the proper operation of the filter because of the dilution of relatively pure filter cake with crystal slurry. In accordance with this invention, an improved in-line type filter is provided for use with fractional crystallization apparatus, which overcomes the disadvantages of the conventional pre-filters.

The following are objects of the invention.

It is an object of the invention to provide improved fractional crystallization apparatus.

Another object of the invention is to provide an improved process for the separation and purification of components of liquid multi-component mixtures.

Still another object of the invention is to provide fractional crystallization apparatus comprising an improved in-line type prefilter.

A further object of the invention is to provide an improved in-line type filter which includes means for cleaning the filter medium so as to prevent its clogging with crystals.

A still further object of the invention is to provide a means and method for synchronizing the operation of a prefiltering means with that of a crystal separation and purification column of fractional crystallization apparatus.

Still other objects and advantages of the invention will become apparent to those skilled in the art upon consideration of the following disclosure.

Broadly speaking, the present invention relates to the separation and purification of components of liquid multi-component mixtures and involves improving the filter rate at which mother liquor is separated from crystals prior to introduction of the crystals into a crystal separation and purification column. In accordance with a broad aspect, the invention comprises forcing filtered liquid back through the filter medium of an in-line filter so as to dislodge any solid material embedded therein. More specifically, the invention resides in improved fractional crystallization apparatus comprising an in-line type prefilter having a piston disposed therein so that movement of the piston in one direction causes liquid to be forced out of the crystal mass through a filter screen while movement in the other direction causes the flow of liquid to be reversed so that at least a portion of the liquid is forced back through the filter screen. This material in flowing through the filter screen cleans the screen by dislodging any embedded crystals and also minimizes the tendency for the filter cake to retract with the piston. In one embodiment of the invention, control means are provided for synchronizing the movement of the column piston in the separation and purification column with the in-line prefilter piston so that backwash liquid is applied to the filter medium at the proper time.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in U. S. application, Serial No. 166,992, filed June 9, 1950, now Patent No. 2,747,001, and of particular importance, there may be mentioned separation of systems containing xylenes, systems containing cyclohexane, systems containing normal paraffins, and systems containing benzene, and the like. Thus, para-xylene can be separated from a multi-component mixture comprising isomeric alkyl benzenes, e. g., from a mixture of para- and meta-xylenes or from para-, meta-, and ortho-xylenes. In the same manner, benzene can be separated from a mixture comprising a paraffinic hydrocarbon such as n-hexane or n-heptane and benzene, and cyclohexane can be separated from a mixture comprising cyclohexane and paraffinic hydrocarbons such as isomeric hexanes boiling close to cyclohexane. Other organic chemicals that may be mentioned include pyridines, dimethylphthalates and fatty acids.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed upwardly through the downwardly moving mass of crystals. This aspect of this invention is in general applicable in those instances where it is desired to increase the concentration of a solution by removing at least a portion of the solvent therefrom.

For a more complete understanding of the invention, reference may be had to the following description of the drawing, in which:

Figure 1 is an elevation, partly in section, of fractional crystallization apparatus illustrating the present invention; and Figures 2 and 3 are partial elevational views of the apparatus of Figure 1 illustrating the operation of the control mechanism.

Referring to Figure 1 of the drawing, an elongated crystal separation and purification column 10 is closed at its upper and lower ends by closure members 11 and 12, respectively. The upper end of column 10 is provided with a compacting means, such as impervious piston 13, connected by a connecting rod 14 to a hydraulic piston 16 in hydraulic cylinder 17. Lines 18 and 19 serve to pass hydraulic fluid alternately into and out of cylinder 17 so as to drive piston 16 which in turn causes the movement of piston 13. It is within the scope of the invention to use a porous piston in which case the piston functions also as a filtering means. When operating the column with a porous piston, an outlet line is connected to the upper end of column 10 for removal of liquid therefrom.

Filter section 21, disposed in an intermediate portion of column 10 comprises a filter medium such as a filter screen 22 surrounded by a jacket 23. Jacket 23 has a line 24 connected thereto for withdrawal of liquid from the filter section. The portion of column 10 below filter section 21 and in communication therewith comprises purification section 26. A heating means is positioned in the lower end of column 10 in order to provide a crystal melting section in that end of the column. As illustrated, the heating means is a coil 27 through which a heat transfer medium is circulated. It is not intended, however, to limit the invention to the specific heating means shown, for other suitable means may be employed. For example, an electrical heater may be positioned next to closure member 12, a coil may be disposed around column 10 at its lower end, or an electrical bayonet type heater may be provided to extend into the end of the column. A liquid outlet line 28 containing a valve 30 is connected to the end of column 10 in order to provide means for removal of melt from the melting section.

Feed inlet line 31 leading from a source of feed material, not shown, is connected to the inlet end of chiller 32. Chiller 32 may be any conventional type of refrigeration means such as a scraped surface chiller, or the chiller may be provided with an auger or piston for moving the crystal slurry formed therein through the chiller. Conduit 33 connects the discharge end of chiller 32 to filter 36. A suitable slurry pump 37 may be positioned in conduit 33, but in many instances it is unnecessary to include this pump. Thus, the crystal slurry formed within chiller 32 can in most cases flow by gravity from the chiller into filter 36.

Filter 36 comprises a cylindrical member 38 open at both ends and having one of its ends connected to separation and purification column 10 at a point above filter section 21. The other end of cylindrical member 38 is connected to cylinder 39 closed at its outer end and encompassing backwash liquid chamber 41. It is noted that column piston 13 is of such a length that during part of its downward stroke it completely blocks the opening of filter 36 into the column while at the end of its backstroke, the opening into the column is unobstructed so as to permit flow of material into the column. A filter medium such as substantially cylindrical filter screen 42 is axially disposed within and spaced apart from cylindrical member 38 so as to provide annular space 43 between the filter screen and the walls of the cylindrical member. Conduit 33 extends into cylindrical member 38 so that the conduit communicates with the interior of the filter screen while outlet conduit 44 is in communication with annular space 43. Line 46 containing a restriction such as valve 47 connects the outer end portion of cylinder 39 to outlet conduit 44. A by-pass line 50, connected to line 46 on either side of valve 47, contains a check valve 55 which is adapted to be closed when liquid is flowing through line 46 from outlet conduit 44 to cylinder 39 and to be open when flow through line 46 is in the opposite direction. While it is preferred to operate with a by-pass line around valve 47 as illustrated, it is within the scope of the invention to omit this line. Outlet conduit 44 also contains solenoid valve 48 which is normally open when its solenoid is deenergized, and a motor valve 49. Motor valve 49 is operatively connected to pressure controller 51 which is in turn operatively connected to outlet conduit 44.

Although the filter zone encompassed by filter screen 42 and cylinder 39 are illustrated as being substantially of the same size, it is not intended to so limit the invention. Thus, cylinder 39 may have a smaller diameter than the filter screen in which case the portion of the piston which moves therein has a correspondingly smaller diameter than the piston portion moving within the filter zone. Suitable seals will be provided to prevent passage of liquid around the piston and into the filter zone or chamber 41.

An elongated, non-porous piston 52 having faces 53 and 54 is positioned within filter 36. Piston 52, which is adapted to move within filter screen 42 and cylinder 39, is connected by connecting rod 56 to hydraulic piston 57 in hydraulic cylinder 58. Cylinder 39 is provided with a suitable seal, not shown, near its juncture with cylindrical member 38 to prevent liquid from flowing around piston 52 and between chamber 41 and the filter zone. Piston 52 is of such a length that during a major portion of its compression stroke the entrance of inlet conduit 33 is blocked by the piston while during a portion of its backstroke and during the beginning of its compression stroke the entrance is open so as to permit crystal slurry to enter the filter zone of filter 36.

Lines 59 and 61 provide means whereby hydraulic fluid is introduced into and withdrawn from hydraulic cylinder 58. Lines 59 and 61 are connected to a source of hydraulic fluid, not shown, by means of line 62 which is connected to the aforementioned lines through lines 63 and 64 and three-way valves 66 and 67. Lines 68 and 69 provide means for venting hydraulic fluid from hydraulic cylinder 58. Valves 66 and 67 as illustrated are solenoid operated valves which are connected through suitable mechanical linkage 71 to solenoid 72. Mechanical linkage 71 comprises a vertical member 70, held in a downward position by means of spring 73 when solenoid 72 is not energized, and arms 74 and 76 operatively connected to valves 66 and 67.

Electrical current to solenoid 72 is supplied by a source of current 77 through electrical lead 78. Electrical lead 78 contains a switch 79 which is actuated on being contacted by a cam member 81 rigidly attached to connecting rod 14. Figures 2 and 3 illustrate the effect of movement of cam 81 upon switch 79 and will be discussed more in detail hereinafter in conjunction with the description of the operation of the apparatus of Figure 1. Electrical lead 82 connects the solenoid of solenoid valve 48 contained in outlet conduit 44 to the source of electrical current through electrical lead 78. The electrical system described hereinabove provides means for synchronizing the movement of column piston 13 and filter piston 52 during the operation of the fractional crystallization apparatus. It is to be understood that it is not intended to limit the invention to the specific control means described for other means may be utilized which come within the scope and spirit of the invention.

While the fractional crystallization apparatus of Figure 1 is in the interest of simplicity of description illustrated and described as occupying a substantially vertical position, it is not intended to so limit the invention. It is to be understood that the apparatus can be otherwise disposed without departing from the spirit or scope of the invention. Thus, the separation and purification column can be positioned horizontally, or the column can be operated vertically with the melting zone in the top of the column rather than in the bottom as illustrated. Furthermore, although the invention has been described in conjunction with a separation and purification column which utilizes a piston as a means for advancing crystals through the column, the invention is not limited to any specific column, but rather it is applicable to any purification column which utilizes a displaced reflux stream to obtain a high purity product.

In the operation of the apparatus of Figure 1, a liquid feed, which may be a liquid multi-component mixture containing components of different melting points, is passed from a source, not shown, into chiller 32 through line 31. Chiller 32 is maintained at a temperature low enough to crystallize a portion of one of the components and form a slurry of crystals in mother liquor. The crystal slurry so formed is removed from the chiller through conduit 33 and passed into filter 36 wherein mother liquor is separated from the crystal slurry and withdrawn through conduit 44. The crystal slurry is allowed to pass into filter 36 during the latter part of the backstroke and the initial part of the compression stroke of piston 52, i. e., during the period that the opening of conduit 33 into the filter zone is unobstructed. The thickened slurry is moved into crystal separation and purification column 10 through the operation of piston 52 as will be described more in detail hereinafter.

As previously mentioned, piston 13 is so constructed that introduction of material into the column is possible only when the lower end of the piston is above the open end of filter 36. The slurry on entering column 10 is moved downwardly by means of piston 13 into filter section 21. Piston 13 is forced downwardly and upwardly by means of hydraulic piston 16 which is moved in response to a hydraulic fluid introduced into and withdrawn from hydraulic cylinder 17 through lines 18 and 19. By operating in this manner, piston 13 on its compression stroke forces crystals downwardly through column 10 while on a portion of its back and compression strokes crystal slurry is allowed to pass into the column from filter 36.

Within filter section 21 additional mother liquor is separated from the crystals and removed from the column through line 24. The crystals thereafter continue their movement as a uniform mass downwardly through the column as a result of the force exerted thereon by piston 13. Crystals on approaching the end of column 10 enter the melting zone maintained in the end of the column by heating means 27. The melting zone is maintained at a temperature at least as high as the melting point of the crystals by the heating means. On reaching the melting zone, the crystals are melted and a portion of the resulting melt is displaced upwardly as a reflux stream into the downwardly moving mass of crystals. The reflux stream on contacting the crystals upstream crystalwise of the melting zone displaces occluded impurities from the crystals by refreezing thereon. A liquid stream comprising displaced impurities is removed from column 10 through filter section 21 by means of line 24. A substantially pure product in the form of melt is withdrawn from the melting zone through line 28.

During the above-described operation of the fractional crystallization apparatus, piston 52 also operates to maintain filter screen 42 free of crystals which may have become embedded therein during movement of the crystals through the filter. Thus, filter screen 42 is backwashed by liquid forced inwardly from annular space 43 as a result of the movement of piston 52. Piston 52 is operated by hydraulic piston 57 which is moved by a suitable hydraulic fluid, such as oil or air, supplied to cylinder 58 through line 62 and either line 59 or 61. The movement of piston 52 is synchronized with the movement of column piston 13 by a suitable control system. As illustrated in Figure 1, column piston 13 is commencing its downward or compression stroke whereas piston 52 is on its compression stroke moving thickened slurry into separation and purification column 10. Piston 52 remains on its compression stroke so long as switch 79 is in an open position during which time solenoid 72 is deenergized and vertical member 70 of mechanical linkage 71 is maintained in a lowered position through the operation of spring 73. Hydraulic fluid is thus permitted to pass through line 62, line 63, and valve 66 and thence into hydraulic cylinder 58 through line 59. Hydraulic piston 57 is thereby moved from left to right within cylinder 58, and piston 52 operatively connected thereto is caused to move on its compression stroke. Hydraulic fluid is vented from hydraulic cylinder 58 through line 61, valve 67 and line 69.

During the compression stroke of piston 52, mother liquor is forced from the crystal slurry into annular space 43 from which it is removed through outlet conduit 44. A portion of this liquid is passed through line 46 into backwash liquid chamber 41 while the remainder is removed through outlet conduit 44 as a product of the process. Check valve 55 in by-pass line 50 is closed during this portion of the cycle of operation so that all of the liquid flowing through line 46 must pass through valve 47. The ratio of these two streams can be controlled by varying the settings of valves 47 and 48. Thus, by increasing the opening of valve 47 in relation to the opening of valve 48, a greater amount of liquid is by-passed from conduit 44 through line 46 into chamber 41. Since the liquid which is passed into chamber 41 is subsequently utilized as the back-wash liquid, the amount of backwash liquid can be controlled by varying the relative openings of valves 47 and 48. With reference to the amount of backwash liquid to be used, it is advantageous to use as little liquid as possible since the liquid must be subsequently removed through the filter screen on the filter cycle. More specifically, the amount of backwash liquid utilized will generally vary between 3 and 25 percent, and preferably between 5 and 10 percent, of the total amount of mother liquor removed from the filter.

Valve 47 remains open at its set position at all times during the conduct of the process whereas valve 48 is preferably open only during the period when piston 52 is on its compression stroke. Thus, valve 48 is a solenoid operated valve which is maintained in an open position when switch 79 is also in an open position. In order to assure a desired even flow of liquid through outlet conduit 44, a flow control means such as a motor valve is provided in the conduit. Pressure controller 51, which is operatively connected to motor valve 49, operates the valve so that a desired predetermined pressure is maintained in conduit 44. In this manner control is maintained over the amount of mother liquor passed through line 46 into chamber 41 and the amount removed from the filter through outlet conduit 44.

As previously mentioned, piston 52 remains on its compression stroke during the period when switch 79 is in an open position. During this period, filter 36 and separation and purification column 10 are in communication so as to allow thickened slurry to enter the column. Cam 81 in moving downwardly with connecting rod 14 contacts switch 79, thereby closing the switch and completing the electrical circuit from source 77 through switch 79, lead 78, and solenoid 72. In Figure 2, cam 81 is illustrated as moving downwardly so as to maintain the switch assembly in a closed position. The cam preferably contacts the switch assembly at the point when the column piston in its downward movement blocks the entrance of filter 36 into column 10.

Solenoid 72 is energized as a result of completing the electrical circuit, causing vertical member 70 of mechanical linkage 71 to be raised against the force of spring 73. The positions of arms 74 and 76 are thereby changed, causing three-way valves 66 and 67 to be positioned oppositely from the positions shown in Figure 1. Hydraulic fluid now passes through line 62, line 64 and valve 67 and thence through line 61 into the right-hand portion of hydraulic cylinder 58. Hydraulic piston 57 is now moved from right to left, and concomitantly piston 52 commences its backstroke. During the period when piston 57 is moving from right to left in hydraulic cylinder 58, hydraulic fluid on the opposite side of the piston is vented through line 59, valve 66 and line 68. As a result of completing the electrical circuit, solenoid valve 48 in outlet conduit 44 is also closed.

During normal operation chamber 41 will only be partially filled with liquid and there will, therefore, be no flow of material through line 46 during the initial part of the backstroke of piston 52. It is to be understood, however, that in some cases it may be advantageous to operate with chamber 41 liquid full in order to commence the backwashing during the initial movement of piston 52. As face 54 of piston 52 approaches the end of cylinder 39, the liquid is forced out of chamber 41 through line 46. During this part of the cycle of operation, check valve 55 in by-pass line 50 is fully open so that the liquid flowing through line 46 by-passes valve 47 thereby permitting unrestricted flow of liquid through the line. Since valve 48 is closed, the liquid passes from line 46 through conduit 44 into annular space 43. As liquid continues to flow into the filter through conduit 44 as a result of the continued movement of piston 52 on its backstroke it is forced from annular space 43 through filter screen 42, thereby dislodging any crystals which may have become embedded therein during the compression stroke of piston 52. The tendency of the filter cake to retract with the piston is also minimized by returning liquid to the filter in this manner. Thus, the tendency for a vacuum to be formed when the piston is retracted is reduced because the volume of liquid introduced at least partially fills the void space left by the retraction of the piston. This effect is especially pronounced when operating with chamber 41 liquid full since liquid then begins to enter the filter as soon as piston 52 begins its backward stroke.

Piston 52 continues on its backstroke so long as switch assembly 79 is maintained in a closed position. This period can be closely controlled by varying the length of cam 81 and its position on connecting rod 14. Cam 81 is preferably constructed and positioned on connecting rod 14 so that switch 79 remains closed during the period when column piston 13 is blocking the entrance of filter 36 into column 10. Since the filter medium of filter 36 is backwashed during the backstroke of piston 52, it is desirable that the opening of the filter into the column be closed during this period in order to prevent mother liquor from entering the column.

The time during which the filter medium of filter 36 is subjected to the effect of the backwash liquid is dependent upon the physical characteristics of the crystals being filtered, the piston drive pressure, screen size, etc. As previously mentioned, the relative opening of valves 47 and 48 can be varied so as to control the amount of liquid passed from the filter into chamber 41 during the compression stroke of piston 52. Thus, by increasing the opening of valve 47 relative to valve 48, an increased amount of liquor is passed into chamber 41. The amount of backwash liquid is thereby increased, and the time during which the filter screen is subjected to backwashing is also increased.

When column piston 13 reaches the bottom of its stroke which is normally about the center of filter section 21, the direction of movement of the piston is reversed. As piston 13 moves upwardly, cam 81 operates to open switch assembly 79, thereby terminating the flow of current to solenoid valve 48 and solenoid 72. The interaction of cam 81 and switch 79 during upward movement of the cam is illustrated in Figure 3. When solenoid 72 becomes deenergized, vertical member 70 of mechanical linkage 71 is moved downwardly by spring 73. As a result of the movement of vertical member 70, arms 74 and 76 are also moved downwardly returning valves 62 and 63 to the positions shown in Figure 1. Hydraulic fluid from line 62 now flows through line 63, valve 66 and line 59 into the left-hand portion of hydraulic cylinder 58. As a result of introducing hydraulic fluid into the left-hand portion of cylinder 58, piston 57 is forced from left to right, carrying with it piston 52 which now commences its compresssion stroke. Hydraulic fluid on the right side of piston 57 is vented through line 61, valve 67 and line 69. During the compression stroke of piston 52, mother liquor, as described hereinbefore, is separated from the crystal slurry which was introduced into filter 36 through conduit 33 during the latter part of the backstroke and the initial part of the compression stroke of piston 52.

A more comprehensive understanding of the invention may be obtained by reference to the following illustrative example which is not intended, however, to be unduly limitative of the invention.

A feed material containing about 40 weight percent para-xylene is charged to the chiller of fractional crystallization apparatus similar to that of Figure 1 at a temperature of about 90° F. and at a rate of 500 pounds per hour. The feed mixture is cooled in the chiller to a temperature —62° F., causing para-xylene to crystallize and form a slurry containing 30 percent solid. The slurry is introduced into the in-line prefilter where mother liquor containing 14.3 weight percent para-xylene is separated from the slurry at a rate of 150 pounds per hour. The resulting slurry, still at about —62° F. and containing 43 percent solids is then passed into the crystal separation and purification column. The slurry is moved through the column by means of a piston into the filter section where additional mother liquor containing 14.3 weight percent para-xylene is recovered at the rate of 197 pounds per hour. The mass of crystals as a result of the force exerted therein by the column piston moves through the column toward the melting zone maintained in the end of the column at a temperature above the melting point of the para-xylene crystals. A stream containing 98.6 weight percent para-xylene is withdrawn from the melting zone at a rate of 153 pounds per hour as a product of the process.

During the compression stroke of the prefilter piston, about 10 percent of the mother liquor (or about 15 pounds per hour) separated from the slurry in the prefilter is passed into the backwash liquid chamber of the prefilter. This liquid is subsequently forced from the chamber by the prefilter piston during its backstroke and returned to the prefilter, passing through the filter medium and dislodging crystals which may have become embedded therein during the compression stroke of the prefilter piston.

It will be apparent to those skilled in the art that various modifications of the invention can be made upon study of the accompanying disclosure. Such modifications are believed to be clearly within the spirit and scope of the invention.

I claim:

1. In fractional crystallization apparatus comprising a closed purification column the improvement of a prefiltering means comprising a substantially cylindrical member having one of its ends connected to said purification column; a cylinder closed at its outer end connected to the other end of said cylindrical member; a substantially cylindrical filter medium disposed within and spaced apart from said cylindrical member so as to form an annular space therebetween; crystal slurry inlet means connected to said cylindrical member and in communication with the interior of said filter medium; piston means for advancing crystal slurry longitudinally through said filter medium and into said purification column; liquid outlet means connected to said cylindrical member and in communication with said annular space; and liquid conduit means connecting the outer end portion of said cylinder with said liquid outlet means.

2. In fractional crystallization apparatus comprising a closed purification column, a heating means associated with one end of said column and a filtering means in an intermediate portion of said column, the improvement of a prefiltering means comprising a substantially cylindrical member having one of its ends connected to said column upstream crystalwise of said filtering means; a cylinder closed at its outer end connected to the other end of said cylindrical member; a substantially cylindrical filter medium disposed within and spaced apart from said cylindrical member so as to form an annular space therebetween; a piston disposed within and adapted to move within said cylinder and said filter medium; crystal slurry inlet means connected to said cylindrical member and in communication with the interior of said filter medium; liquid outlet means connected to said cylindrical member and in communication with said annular space; and liquid conduit means connecting the outer end portion of said cylinder with said liquid outlet means.

3. Fractional crystallization apparatus comprising, in combination, an elongated, closed purification column; heating means associated with one end of said column; means for withdrawing a purified product from said end of said column; filtering means in an intermediate portion of said column; an elongated piston in the opposite end of said column from said heating means, said piston being adapted to move within said column at least up to said filtering means; a substantially cylindrical member open at both ends and having one of its ends connected to said column upstream crystalwise of said filtering means; a cylinder closed at its outer end connected to the other end of said cylindrical member; a substantially cylindrical filter medium disposed within and spaced apart from said cylindrical member so as to form an annular space therebetween; an elongated piston disposed within and adapted to move within said cylinder and said filter medium; crystal slurry inlet means connected to said cylindrical member and in communication with the interior of said filter medium; liquid outlet means connected to said cylindrical member and in communication with said annular space; and liquid conduit means connecting the outer end portion of said cylinder with said liquid outlet means.

4. Fractional crystallization apparatus comprising, in combination, an elongated, closed purification column; heating means associated with one end of said column; means for withdrawing a purified product from said end of said column; filtering means in an intermediate portion of said column; an elongated piston in the opposite end of said column from said heating means, said piston being adapted to move within said column at least up to said filtering means; a substantially cylindrical member open at both ends and having one of its ends connected to said column upstream crystalwise of said filtering means; a cylinder closed at its outer end connected to the other end of said cylindrical member; a substantially cylindrical filter medium disposed within and spaced apart from said cylindrical member so as to form an annular space therebetween; an elongated piston disposed within and adapted to move within said cylinder and said filter medium; crystal slurry inlet means connected to said cylindrical member and in communication with the interior of said filter medium; liquid outlet means connected to said cylindrical member and in communication with said annular space; liquid conduit means connecting the outer end portion of said cylinder with said liquid outlet means; a first flow control means positioned in said liquid conduit means; a second flow control means positioned in said liquid outlet means downstream from the point at which said liquid conduit means is connected to said liquid outlet means; a third flow control means positioned in said liquid outlet means downstream from said second flow control means; and a pressure controller operatively connected to said third flow control means and to said liquid outlet means at a point between said second and third flow control means.

5. Fractional crystallization apparatus, comprising, in combination an elongated, closed purification column; heating means associated with one end of said column; means for withdrawing a purified product from said end of said column; filtering means in an intermediate portion of said column; an elongated piston in the opposite end of said column from said heating means, said piston being adapted to move within said column on its compression stroke to about the middle of said filtering means; a substantially cylindrical member open at both ends and having one of its ends connected to said column upstream crystalwise of said filtering means; a cylinder closed at its outer end connected to the other end of said cylindrical member; a substantially cylindrical filter medium disposed within and spaced apart from said cylindrical member so as to form an annular space therebetween; crystal slurry inlet means connected to said cylindrical member and in communication with the interior of said filter medium; liquid outlet means connected to said cylindrical member and in communication with said annular space; liquid conduit means connecting the outer end portion of said cylinder with said liquid outlet means; an elongated prefilter piston disposed within and adapted to move within said cylinder and said filter medium; a hydraulic cylinder positioned adjacent said cylinder; a hydraulic piston in said hydraulic cylinder, said piston being operatively connected to said piston disposed within said cylinder and said filter medium; first conduit means for introducing and withdrawing hydraulic fluid from one end of said cylinder; and second conduit means for introducing and withdrawing hydraulic fluid from the opposite end of said hydraulic cylinder.

6. The apparatus of claim 5 in which a first flow control means is contained in said liquid conduit means, a second flow control means is positioned in said liquid outlet means downstream from the point at which said liquid conduit means is connected to said liquid outlet means, a third flow control means is positioned in said liquid outlet means downstream from said second flow control means, and a pressure controller is operatively connected to said third flow control means and to said liquid outlet means at a point between said second and third flow control means.

7. The apparatus of claim 6 in which means are provided for synchronizing the movement of said column piston with said prefilter piston, said means comprising a first three-way valve, said valve being connected to said first conduit means; a second three-way valve, said valve being connected to said second conduit means; a hydraulic fluid inlet line, said line being connected to each said first and second three-way valves; a first fluid outlet line connected to said first three-way valve; a second fluid outlet line connected to said second three-way valve; and means for actuating said first and second three-way valves and said second flow control means in said liquid outlet means so that hydraulic fluid is introduced into said hydraulic cylinder through said first conduit means and withdrawn therefrom through said second conduit means line and said second flow control means is in an open position during the compression stroke of said column piston, and so that hydraulic fluid is introduced into said hydraulic cylinder through said second conduit means and withdrawn therefrom through said first conduit means and said second flow control means is in a closed position during the back stroke of said column piston.

8. In a process for separating a component from a multi-component liquid mixture, said component forming crystals upon the cooling of said mixture, which comprises introducing a slurry of said crystals in mother liquor into a purification zone, separating mother liquor from said slurry in the upstream portion, with respect to crystal movement, of said purification zone, moving crystals through said purification zone toward a melting zone in the downstream end, with respect to crystal movement, of said purification zone, melting crystals in said melting zone, displacing a portion of the resulting melt into said moving crystals, and recovering a purified product from said melting zone, the improvement comprising introducing said slurry of crystals in mother liquor into a prefiltering zone; withdrawing mother liquor from said prefiltering zone through a filter medium; forcing the resulting thickened slurry of crystals in mother liquor into said purification zone; passing a portion of the mother liquor withdrawn from said prefiltering zone into a backwash liquid chamber; terminating the introduction of said thickened slurry into said purification zone; terminating the withdrawal of mother liquor from said prefiltering zone; and forcing mother liquor from said backwash liquid chamber into said prefiltering zone and through said filter medium so as to dislodge any crystals embedded therein.

9. In a process for separating a component from a multi-component liquid mixture, said component forming crystals upon the cooling of said mixture, which comprises introducing a slurry of said crystals in mother liquor into a purification zone, separating mother liquor from said slurry in the upstream portion, with respect to crystal movement, of said purification zone, moving crystals through said purification zone toward a melting zone in the downstream end, with respect to crystal movement, of said purification zone, melting crystals in said melting zone, displacing a portion of the resulting melt into said moving crystals, and recovering a purified product from said melting zone, the improvement comprising introducing said slurry of crystals in mother liquor into a prefiltering zone; withdrawing mother liquor from said prefiltering zone through a filter medium; forcing the resulting thickened slurry of crystals in mother liquor into said purification zone; passing a portion of the mother liquor withdrawn from said prefiltering zone into a backwash liquid chamber; terminating the introduction of said thickened slurry into said purification zone during downstream movement of crystals within said zone; terminating the withdrawal of mother liquor from said prefiltering zone; and during downstream movement of crystals within said purification zone forcing mother liquor from said backwash liquid chamber into said prefiltering zone and through said filter medium so as to dislodge any crystals embedded therein.

10. The process of claim 8 in which said multi-component mixture comprises isomeric alkylbenzenes.

11. The process of claim 10 in which said mixture contains para-xylene and said para-xylene is recovered as the product.

12. The process of claim 8 in which said multi-component mixture comprises benzene and a paraffinic hydrocarbon, and benzene is recovered as the product.

13. The process of claim 8 in which said multi-component mixture comprises cyclohexane and a paraffinic hydrocarbon, and cyclohexane is recovered as the product.

References Cited in the file of this patent

UNITED STATES PATENTS

| | | |
|---|---|---|
| 2,244,078 | Perlberg | June 3, 1941 |
| 2,345,683 | Owens | Apr. 4, 1944 |
| 2,683,178 | Findlay | July 6, 1954 |
| 2,747,001 | Weedman | May 22, 1956 |
| 2,751,890 | Rush | June 26, 1956 |

FOREIGN PATENTS

| | | |
|---|---|---|
| 1,111,151 | France | Oct. 26, 1955 |